US007657261B2

(12) United States Patent
Cooper et al.

(10) Patent No.: US 7,657,261 B2
(45) Date of Patent: Feb. 2, 2010

(54) TECHNIQUE FOR USING THE SAME WIRELESS FREQUENCY CHANNEL IN OVERLAPPING OR ADJACENT COVERAGE AREAS

(75) Inventors: Rotem Cooper, San Diego, CA (US); Glenn Salaman, Lafayette, CO (US); James A. Hutchison, San Diego, CA (US); Robbin D. Hughes, San Diego, CA (US); Vanitha Aravamudhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 518 days.

(21) Appl. No.: 11/352,510

(22) Filed: Feb. 10, 2006

(65) Prior Publication Data

US 2007/0191005 A1 Aug. 16, 2007

(51) Int. Cl.
*H04Q 7/20* (2006.01)
(52) U.S. Cl. .................. 455/434; 455/432.1; 455/435.1
(58) Field of Classification Search ................. 455/434, 455/435.2
See application file for complete search history.

(56) References Cited

U.S. PATENT DOCUMENTS

| 5,504,803 | A | * | 4/1996 | Yamada et al. ........... 455/426.1 |
| 5,734,980 | A | | 3/1998 | Hooper et al. |
| 6,085,085 | A | * | 7/2000 | Blakeney et al. ......... 455/426.1 |
| 6,529,491 | B1 | | 3/2003 | Chang et al. |
| 6,978,142 | B2 | * | 12/2005 | Jokimies ..................... 455/449 |
| 2002/0187804 | A1 | * | 12/2002 | Narasimha et al. ........... 455/552 |
| 2003/0096611 | A1 | * | 5/2003 | Cooper ....................... 455/434 |
| 2003/0148786 | A1 | | 8/2003 | Cooper et al. |
| 2004/0192328 | A1 | * | 9/2004 | Giacalone et al. ........... 455/455 |

FOREIGN PATENT DOCUMENTS

| GB | 2343088 | 4/2000 |
| WO | 9965270 | 12/1999 |
| WO | 0035212 | 6/2000 |

OTHER PUBLICATIONS

International Search Report—Patent Cooperation Treaty—US07-061948 International Search Authority—European Patent Office—Jul. 18, 2007.
International Search Report—Patent Cooperation Treaty—US07-061948 International Search Authority—European Patent Office—Oct. 5, 2007.

* cited by examiner

*Primary Examiner*—Lester Kincaid
*Assistant Examiner*—Charles Shedrick
(74) *Attorney, Agent, or Firm*—Alex C. Chen; Eric Ho

(57) ABSTRACT

One aspect of the invention provides a system, apparatus and method that allow a wireless communication device to intelligently search for and select a communication cell based on a system identifier (SID) and network identifier (NID) order of preference rather than just pilot signal strength. Generally, a mobile device scans a frequency channel associated with the highest preferred SID/NID for pilot signals at different PN offsets. The cell associated with the strongest pilot signal detected is queried to determine whether it belongs to the SID/NID sought. If the selected PN offset belongs to a cell associated with the SID/NID sought then it is used for communications. Otherwise, the SID/NID identification process is repeated for the next strongest PN offset detected on the same frequency channel. If no pilot signals meeting these criteria are found in the frequency channel, the next highest preferred SID/NID is selected and the process is repeated.

28 Claims, 5 Drawing Sheets

| System Table |||||
|---|---|---|---|
| Service Provider Network (SID) | Network (NID) | Preference | Acquisition Index |
| 1 | 12 | Most Preferred | 1 |
| 2 | 10 | Preferred | 2 |
| 5 | 14 | Preferred | 3 |
| 6 | 32 | Less Preferred | 4 |
| 8 | 22 | Negative | 5 |

| Acquisition Table ||
|---|---|
| Index | Frequency Channels |
| 1 | 100, 200, 300 |
| 2 | 150, 250, 350 |
| 3 | 400, 450, 500 |
| 4 | 600, 700 |
| 5 | 800, 850 |

TECHNIQUE FOR USING THE SAME WIRELESS FREQUENCY CHANNEL IN OVERLAPPING OR ADJACENT COVERAGE AREAS

BACKGROUND

1. Field

The present invention generally relates to wireless cellular communication systems, and more specifically to a wireless communication device and method for selecting a communication cell based on a preference order rather than just signal strength.

2. Background

Wireless communication systems are typically divided into coverage zones having distinct communication frequency channels in each adjacent coverage zones. A wireless communication system, typically identified by a system identifier (SID), may have multiple overlapping or non-overlapping coverage zones to provide communication coverage to wireless mobile devices. Each coverage zone may be defined by a network identifier (NID). One or more communication cells (e.g. antenna towers or base stations) may be associated with each coverage zone or network. As a wireless mobile device travels from one coverage zone to another, it communicates with different communication cells on the same or different communication frequency channels. In a Code Division Multiple-Access (CDMA) communication system, communication cells within a coverage zone may communicate on the same frequency channel.

CDMA is a spread-spectrum communication protocol that utilizes orthogonally coded signals occupying the same spectral bandwidth (e.g., 1.25 MHz). A CDMA signal is spread by one of N (e.g. N=64) orthogonal codes (e.g., Walsch codes or "spreading codes") that spread the signal over a bandwidth range (e.g., approximately 1.25 MHz). A spreading code is used by each communication cell of a network to transmit signals that are statistically uncorrelated, and therefore separable and non-interfering. For a particular frequency channel, a spreading code is identical for all communication cells (e.g., base stations or towers), except that each communication cell has a different phase-delayed version of the same spreading code. This is usually represented as a time shift or offset measured in chips (e.g., a "chip" may be approximately 0.8 microseconds). This time offset in the spreading code is what uniquely identifies each communication cell (e.g., tower or base station). The pilot channel (spreading code 0) is an unmodified version of the spreading code. It is the pilot channel offset that is used by a mobile device (e.g., mobile phone) to identify a communication cell, distinguish it from other cells, and thereby communicate with the proper cell.

The pilot channel time shift or offset is typically expressed as a "PN offset" reference to absolute time (e.g., PN0). The spreading code sequence repeats periodically (e.g., every 2 seconds). Therefore, PN0 aligns with the beginning of the spreading code period, PN1 is advanced by one time offset (e.g., by 64 chips), PN2 is advanced by two time offsets (e.g., by 128 chips), and so on. The term "PN" stands for "pseudo noise," which has its origins in spread spectrum theory. There may be up to K (e.g., K=512) unique PN offsets available to network operators.

The PNs used by a particular network operator are typically confined to integer multiples of a PN increment. For example, a PN increment of 3 means that PN0, PN3, PN6, PN9, may be assigned to cells in the network. Each CDMA system operator selects a PN increment value based primarily on its communication cell density. A PN increment of 3 provides more PN time shifts than a PN6 since the total number of unique PN offsets is fixed. PN values may be reused in the same network provided the cells are located at a significant distance from one another and their signals do not interfere with each other. To identify a communication cell, a receiving mobile device measures the time offset (from PN0) of the spreading code of a perceived pilot signal.

Typically, when a wireless mobile device is first switched On, its receiver scans a particular communication frequency channel for pilot signals at different PN offset (e.g. from one or more communication cells). The PN offset having the strongest pilot signal strength is usually selected for communication.

Currently, wireless service providers or carriers are assigned or allocated one or more communication frequency channels and PN offsets in each coverage zone in which they operate. Use of the same communication frequency channel by different wireless service providers in adjacent coverage zones is avoided to prevent interference. Wireless service providers spend significant resources in adjusting their cell antennas (e.g. on base stations) to provide coverage to their subscribers while trying to avoid interference with other carriers utilizing the same frequency channels in nearby areas or coverage zones.

For example, because of the nature of RF propagation, pilot signals on a particular frequency from wireless service provider X in coverage zone A may be stronger in parts of an adjacent coverage zone B than the pilot signals same frequency of wireless service provider Y assigned to coverage zone B. A mobile device in coverage zone B, that is a customer of wireless service provider Y, may pickup the stronger pilot signals from wireless service provider X and communicates through wireless service provider X. This may cause the wireless user to incur unwanted roaming charges. Alternatively, wireless service provider X may deny service to customers of wireless service provider Y, thereby preventing the customer from obtaining a communication link even though he/she is located within the coverage zone of wireless service provider Y.

The use of the same frequency is also a problem where a private wireless network is deployed within a larger public wireless network or overlaps a public wireless network. To maximize the use of their spectrum, the public and/or private operators may use the same communication frequency for the public and private networks. Because mobile devices currently communicate through a communication cell associated with the PN offset having the strongest pilot signal on a particular communication frequency, subscribers of the private network may end up communicating through the public network cells and vice versa.

Thus, a way is needed to intelligently identify and select communication cells operating on the same communication frequency channel in overlapping, adjacent, or co-extensive coverage zones while keeping mobile devices from roaming, unnecessarily, to another provider's network.

SUMMARY

A system, apparatus and/or method are provided that allow a wireless communication device to intelligently search for and select a communication cell based on a system identifier (SID) and network identifier (ND) order of preference rather than just pilot signal strength. Generally, a mobile device scans a frequency channel associated with the highest preferred SID/NID for pilot signals at different PN offsets. The cell associated with the strongest pilot signal detected is queried to determine whether it belongs to the SID/NID sought.

If the selected PN offset belongs to a cell associated with the SID/NID sought then it is used for communications. Otherwise, the SID/NID identification process is repeated for the next strongest PN offset detected on the same frequency channel. If no pilot signals meeting these criteria are found in the frequency channel, the next highest preferred SID/NID is selected and the process is repeated.

One embodiment of the invention include a mobile device comprising: (a) a wireless communication interface, (b) a storage device to store a roaming list including one or more SID/NID pairs and their one or more corresponding frequency channels, and (c) a processing unit configured to (1) obtain a first SID/NID pair according to a preference rank, (2) obtain a first frequency channel associated with the first SID/NID pair, (3) scan one or more time offsets of the first frequency channel for pilot signals, and (4) select a first time offset having the strongest pilot signal associated with the first SID/NID pair. The processing unit may also (1) compare the signal strengths of one or more pilot signals detected on the one or more time offsets for the first frequency channel, (2) determine whether the pilot signal associated with the first time offset meets a minimum threshold level, and (3) reject pilot signals on different time offsets that are stronger than the pilot signal on the first time offset if the pilot signals are associated with SID/NID pairs other than the first SD/ND pair. If the strongest pilot signal on the first frequency channel is associated with an SID/NID pair other than the first SID/NID pair, then the processing unit determines whether it is likely that another pilot signal on the first frequency channel are associated with the first SID/NID pair. If a pilot signal associated with the first SID/NID pair is not found on the first frequency channel, the processing unit is further configured to (1) obtain a second frequency channel associated with the first SID/NID pair, and (2) scan one or more time offsets of the second frequency channel for the strongest pilot signal. If a pilot signal associated with the first SID/NID pair is not found on the first frequency channel, the processing unit is configured to (1) obtain a second SID/NID pair according to a preference rank, (2) obtain a second frequency channel associated with the second SID/NID pair, (3) scan one or more time offsets of the second frequency channel for the strongest pilot signal, and (4) select a second time offset having the strongest pilot signal associated with the second SID/NID pair.

Another feature of the invention provide that upon startup, the processing unit is configured to (1) scan one or more time offsets of a startup frequency channel for pilot signals, (2) select a second time offset having the strongest pilot signal found in the startup frequency channel, (3) obtain the SID/ND associated with the second time offset from a cell associated with the second time offset, and (4) compare the startup frequency channel to the first frequency channel to determine whether they are the same. If the startup frequency channel and first frequency channel are the same, the processing unit is configured to determine if the second SID/NID pair is the same as the first SID/NID pair. If the second SID/NID pair and first SID/NID pair are the same, then the processing unit uses the second SID/NID pair to establish a communication link with a cell operating on the second time offset of the startup frequency channel. If the second SID/NID pair and first SID/NID pair are not the same, then the processing unit searches for the strongest pilot signal associated with the first SID/NID pair on the first frequency channel. If the startup frequency channel and first frequency channel are not the same, the processing unit scans the first frequency channel for a pilot signal associated with the first SID/NID pair.

A method operational on a mobile device for selecting a wireless communication channel is also provided. This method comprises (a) obtaining a first system identifier (SID) and network identifier (NID) pair according to a preference rank, (b) obtaining a first frequency channel associated with the first SID/NID pair, (c) scanning one or more time offsets of the first frequency channel for pilot signals, (d) comparing the signal strengths of one or more pilot signals detected on the one or more time offsets for the first frequency channel, (e) determining whether the pilot signal of the first time offset meets a minimum threshold level, (f) selecting a first time offset having the strongest pilot signal associated with the first SID/NID pair, and (g) rejecting pilot signals on different time offsets that are stronger than the pilot signal on the first time offset if the pilot signals are associated with SID/NID pairs other than the first SID/NID pair. If the strongest pilot signal on the first frequency channel is associated with an SID/NID pair other than the first SID/NID pair, the method also determines whether it is likely that another pilot signal on the first frequency channel is associated with the first SID/NID pair. The method may further include steps for (a) storing time offsets associated with undesirable SID/NID pairs, and (b) performing a rescan of time offsets of the first frequency channel for the strongest pilot signal while ignoring pilot signals from the time offsets associated with the undesirable SID/NID pairs.

Yet another method operational on a mobile device for selecting a wireless communication channel is provided. The method comprises (1) scanning one or more time offsets of a startup frequency channel for pilot signals, (2) selecting a first time offset having the strongest pilot signal found in the startup frequency channel, (3) obtaining a first system identifier (SID) and network identifier (NID) pair associated with the first time offset from a cell associated with the first time offset, (4) obtaining a second SID/NID pair according to a highest preference rank from the mobile device, (5) obtaining a first frequency channel associated with the second SID/NID pair, and (6) comparing the startup frequency channel to the first frequency channel to determine whether they are the same. If the startup frequency channel and first frequency channel are the same, then the method determines if the first SID/NID pair is the same as the second SID/NID pair. If the first SID/NID pair and second SID/NID pair are the same, then the first SID/NID pair is used to establish a communication link with a cell operating on the first time offset of the startup frequency channel. If the first SID/NID pair and second SID/NID pair are not the same, then the method searches for the strongest pilot signal associated with the second SID/ND pair on the startup frequency channel. If the startup frequency channel and first frequency channel are not the same, then the method (1) scans one or more time offsets of the first frequency channel for a pilot signal associated with the second SID/NID pair, and (2) selects a second time offset on the first frequency channel having the strongest pilot signal associated with the second SID/NID pair.

DETAILED DESCRIPTION

Figure 1:
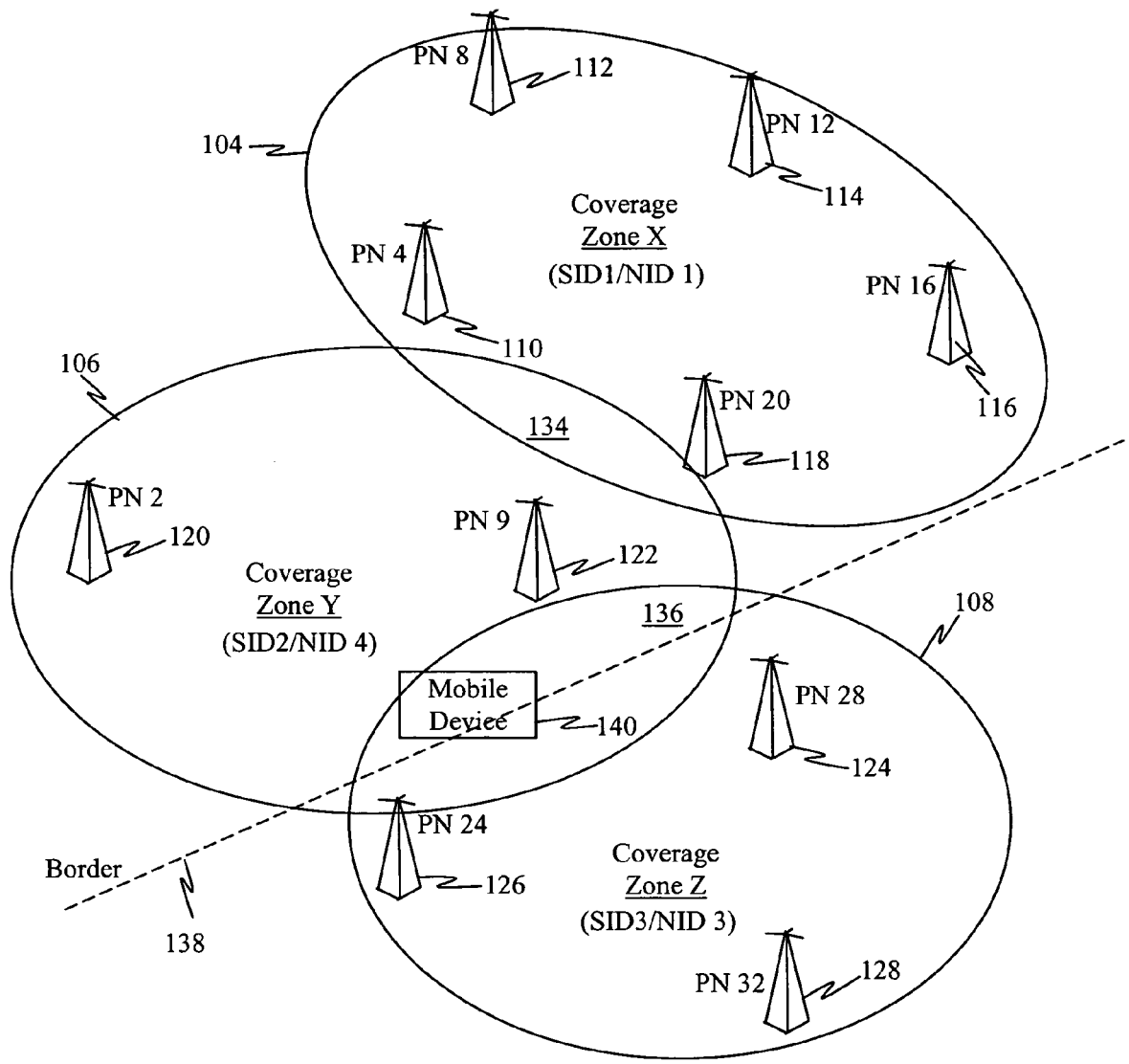
FIG. 1 is a diagram illustrating coverage zone configurations in which a wireless mobile device with intelligent cell search and select capabilities may operate.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

In the following description, certain terminology is used to describe certain features of one or more embodiments of the invention. For instance, the terms "mobile device", "wireless device", and "wireless mobile device" are interchangeably used to refer to mobile phones, pagers, wireless modems, personal digital assistants, personal information managers (PIMs), palmtop computers, laptop computers, and/or other mobile communication/computing devices which communicate through a cellular network. The terms "coverage area" or "coverage region" or "coverage zone" refers to a geographic area having one or more cells associated with a wireless service provider. The term "cell" or "communication cell" refers to a particular tower, antenna, or base station with which wireless communication devices communicate in a coverage zone. The terms "PN offset" and "time offset" refer to a phase-delay or phase-shift of a base frequency.

One aspect of the invention provides a system, apparatus and method that allow a wireless communication device to intelligently search for and select a communication cell based on a system identifier (SID) and network identifier (NID) order of preference rather than just pilot signal strength. This allows a wireless subscriber to operate on his/her own service provider's wireless network even though stronger pilot signals from other wireless network operators are present on a particular communication frequency channel, thereby avoiding roaming charges and/or denial of service. Generally, a mobile device scans predetermined frequency channels for pilot signals belonging to a particular SID/NID in an order of preference. This order of preference may be obtained from a predetermined ranking of SIDs/NIDs. A frequency channel associated with the highest preferred SID/NID is scanned for pilot signals at different PN offsets. The cell associated with the strongest pilot signal detected is queried to determine whether it belongs to the SID/NID sought. If the selected PN offset belongs to a cell associated with the SID/NID sought then it is used for communications. Otherwise, the SID/NID identification process is repeated for the next strongest PN offset detected on the same frequency channel. If no pilot signals meeting these criteria are found in the frequency channel, the next highest preferred SID/NID is selected and the process is repeated.

FIG. 1 is a diagram illustrating coverage zone configurations in which a wireless mobile device with intelligent cell search and select capabilities may operate. Coverage Zone X 104 is associated with SID 1 and NID 1) and encompassing a plurality of cells 110, 112, 114, 116, and 118, having PN offsets 4, 8, 12, 16 and 20, respectively. Similarly, coverage Zone Y 106 is associated with SID 2 and NID 4 and has cells 120 and 122 with PN offsets 2 and 9, and coverage Zone Z 108 is identified with SID3 and NID 3 and has cells 124, 126, 128 having PN offsets 28, 24, and 32, respectively. A subscriber mobile device 140 may roam among coverage Zones X 104, Y 106, and Z 108 and communicate with different cells as it moves.

In a typical CDMA communication system, all cells associated with a service provider in a coverage zone operate on the same frequency channel, but with different PN offsets. In some instances, the same communication frequency may be allocated and used by different wireless service providers in overlapping or adjoining coverage zones, networks or across borders. This may create overlapping coverage regions 134 and 136 where two or more wireless service providers use the same communication frequency channel. Such overlapping regions 134 and 136 may be caused by the propagation characteristics of radio frequencies, geographic anomalies or city, state or national boundaries. For example, different adjoining or overlapping municipal, state, or federal governments may license different wireless service providers to use the same frequency channel. Thus, near a border 138, overlapping coverage zones 106 and 108 may have an overlapping region 136 in which the same communication frequency is employed.

One embodiment of the invention permits a wireless mobile device 140 to operate in overlapping zones 134 and 136 and select its own wireless service provider even if another wireless service provider has a stronger pilot signal on the frequency channel used by both service providers. That is, rather than selecting a cell having the strongest pilot signal, the mobile device 140 is configured to communicate with the cell belonging to its wireless service provider. For example, coverage Zone Y 106, belonging to a first wireless service provider, and coverage Zone Z, belonging to a different wireless service provider, operate on the same frequency channel. Mobile device 140 may be a subscriber of the first wireless service provider of coverage Zone Y 106. Even if the pilot signal from cell 126 in Zone Z is stronger in overlapping area 136 than the pilot signal from cells 120 and 122 in Zone Y, belonging to the first wireless service provider, mobile device 140 is configured to use cells 120 or 122 belonging to the first wireless service provider. It does this be recognizing whether a selected PN offset is associated with a cell belonging to its wireless service provider. If it is not, then the mobile device seeks the next strongest pilot signal and repeats the process until a PN offset is found having a pilot signal which originates on a cell belonging to its service provider or a preferred service provider.

Figure 2:
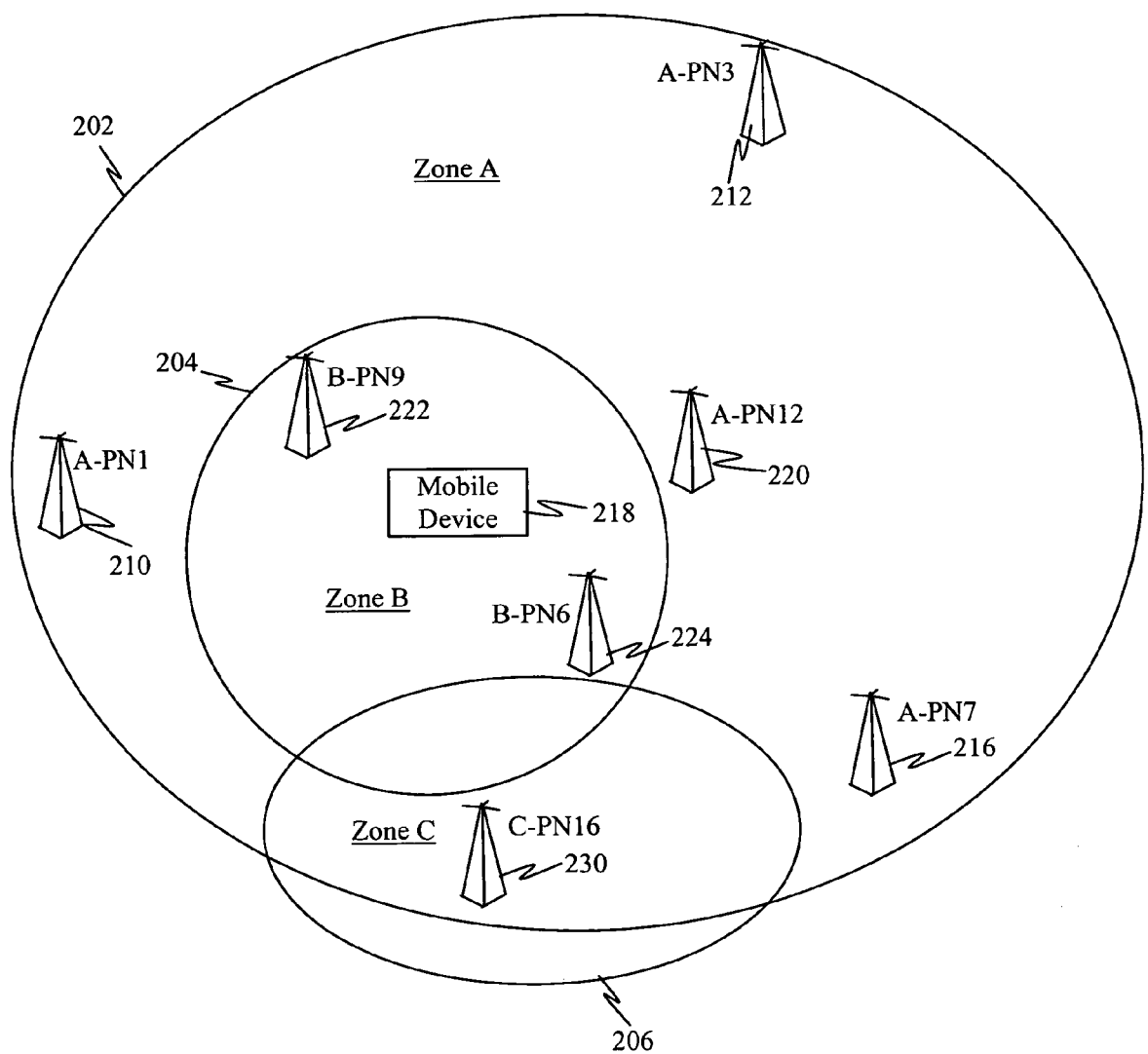
FIG. 2 is another diagram illustrating wireless network coverage areas in which a mobile device having intelligent search and select capabilities may operate.

FIG. 2 is another diagram illustrating wireless network coverage areas in which a mobile device having intelligent search and select capabilities may operate. In some wireless communication systems, one or more coverage Zones B 204 and C 206 may be allocated within a larger coverage Zone A 202. In many instances, one or more of these coverage zones A 202, B 204, and C 206 may operate on the same communication frequency channel.

A wireless mobile device 218 may be a subscriber of a first wireless service provider operating in Zone A 202, having cells (A-PN1) 210, (A-PN3) 212, (A-PN7) 216, and (PN12) 220 operating on a first frequency channel. The mobile device 218 may be configured to search for pilot signals at by scanning the radiated energy at different PN offsets on the first frequency channel. A second wireless service provider may operate in Zone B 204 on the same first frequency channel through cells (B-PN9) 222 and (B-PN6) 224. Under the conventional CDMA search algorithm, mobile device 218 would scan the first frequency channel and select the PN offset having the greatest signal strength. Such conventional algorithm may lead to the selection of cell 222, which is operated by the second wireless service provider, rather than the mobile device's first wireless service provide. However, according to one aspect of the present invention, mobile device 218 is instead configured to, preferably, select a cell operated by its wireless service provider (i.e., the first wireless service provider) even if another cell radiates a stronger pilot signal on the first frequency channel. For example, cell 220 may be selected if it radiates the strongest pilot signal (as detected by mobile device 218) originating from a cell in Zone A 202 (e.g., belonging to the first service provider).

Similarly, mobile devices of the wireless service providers for Zones B 204 and C 206 would also seek to communicate through their respective provider's cells. For instance, a mobile device that subscribes to the service provider of Zone C 206 would first seek to communicate through cell 230 (C-PN16) rather than cell 216 (A-PN7) or any other cell not belonging its network (e.g., Zone C 206).

Figures 3, 4, 5:
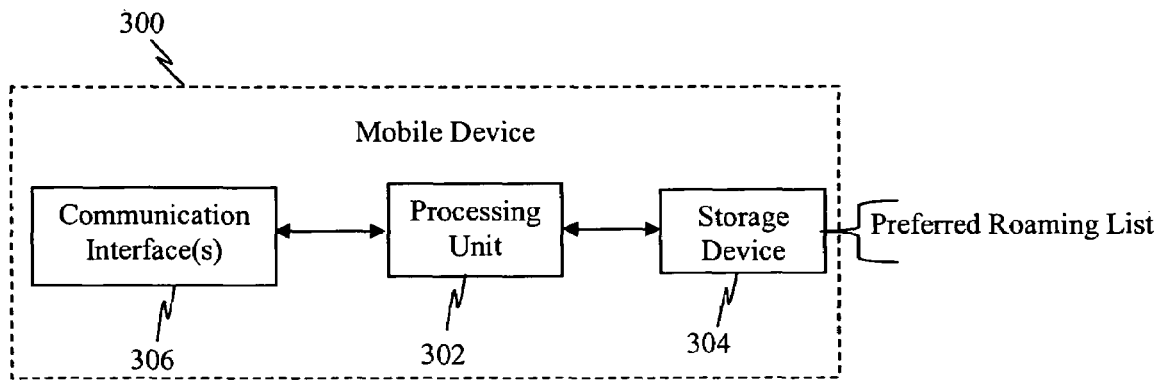
FIG. 3 is a block diagram illustrating a wireless mobile device having intelligent cell selection according to some embodiments of the invention.
FIG. 4 illustrates a System Table that may be employed by a mobile device in implementing intelligent cell search and selection according to some embodiments of the invention.
FIG. 5 illustrates an Acquisition Table that may be employed by a mobile device in implementing intelligent cell search and selection according to some embodiments of the invention.

FIG. 3 is a block diagram illustrating a wireless mobile device having intelligent cell selection according to some embodiments of the invention. Mobile device 300 may include a processing unit 302, a storage device 304 and one or more communication interfaces 306. Communication interface(s) 306 may include one or more wired or wireless communication interfaces that enable mobile device 300 to communicate with communication cells. Storage device 304 may be configured to store information used by the mobile device 300 to search for and select a cell with which to communicate. For example, the storage device 304 may store a preferred roaming list (PRL), which identifies one or more wireless networks (e.g., SIDS, NIDs, communication frequencies, etc.) that the mobile device uses to intelligently search for and select pilot signals. The PRL may indicate an order of preference in which the systems and networks (SID/NID) on a frequency channel should be scanned.

When a conventional mobile device searches or scans for pilot signals from cells it typically scans a particular communication frequency for the strongest pilot signal at predetermined PN offsets and selects the cell associated with the strongest pilot signal detected. This brute force approach is wasteful since the mobile device scans numerous PN offsets to determine which one has the strongest pilot signal. Additionally, if the strongest detected pilot signal on the frequency channel belongs to a different service provider, the mobile device often changes frequency channels and repeats the process.

According to one implementation, mobile device 300 includes intelligent cell search and selection by selecting a communication cell based on a defined SID/SID order of preference. For a selected frequency channel, the processing unit 302 scans a plurality of PN offsets. The PN offset having the strongest pilot signal power is selected and the cell associated with the selected PN offset is queried to determine if it corresponds to a cell in the highest ranked or most preferred SID/NID pair. If so, the PN offset is used by the mobile device 300 for further wireless communications. Otherwise, the PN offset having the next strongest pilot signal is queried and the process is repeated. The mobile device 300 may store PN offset information (e.g., SID/NID) for pilot signals detected on its scan of the selected frequency channel for subsequently finding a cell belonging to a particular SID/NID.

In alternative embodiments, the intelligent cell search and selection scheme may be applied for all pilot signal searches or after unsuccessfully scanning a plurality of PN offsets for the strongest pilot signal in a frequency channel. In selecting between cells, those cells associated with networks belonging to the service provider of the mobile device may be preferred over those of other service providers.

One or more of the components and functions illustrated in FIG. 3 may be rearranged and/or combined into a single component or embodied in several components without departing from the invention. Additional elements or components may also be added without departing from the invention.

In conventional CDMA systems, the mobile device simply selects the PN offset having the strongest pilot signal and communicates through the cell associated with the selected PN offset. However, this may lead to denial of services or roaming changes if the selected cell belongs to another service provider. Alternatively, the mobile device may just change communication frequencies and repeat its search for a pilot signal. Changing frequency channels is disfavored since it tends to delay the acquisition of a new cell.

Mobile devices typically include a Preferred Roaming List (PRL) which includes a System Table (FIG. 4) and an Acquisition Table (FIG. 5). The System Table typically includes pairs of SIDs and NIDs and their preference state (e.g., Most Preferred, Preferred, Less Preferred, Negative, etc.). Note that other classifiers of relative preference may be used in various embodiments of the invention. The System Table may include one or more SIDs, each SID corresponding to a geographical region, and corresponding NIDs, each NID representing a network within the geographical region. The SID/NID pairs in the System Table may be arranged in an order of preference (e.g., from most preferred to least preferred) within a region. For example, for the same SID, the NIDs may be arranged in an order of preference, from highest to lowest preference. In the System Table, an SID/NID pair has an index which references frequency channels in the Acquisition Table. These simplified System and Acquisition Tables are used to illustrate the novel concepts of the present invention and other System and Acquisition Tables, as specified in International Standard (IS) 683, for example, may be used. The present invention may be implemented on various types of communication systems, including CDMA2000, W-CDMA, TDCMA, and UMTS, among others.

Figure 6:
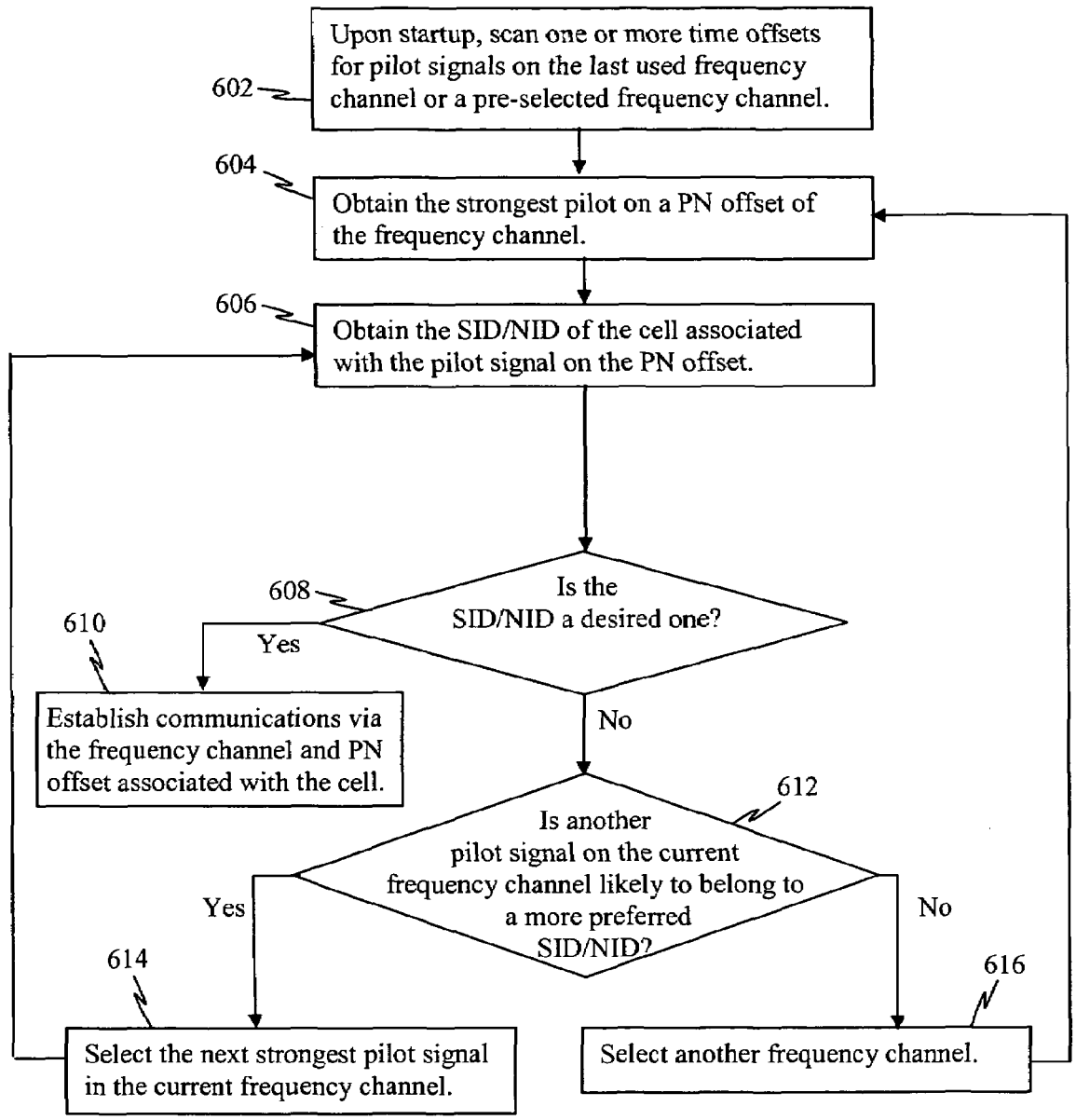
FIG. 6 is a flow diagram illustrating a general method for implementing intelligent cell search and selection.

FIG. 6 is a flow diagram illustrating a general method for implementing intelligent cell search and selection. Upon startup (e.g., power-up), a wireless mobile device scans one or more PN offsets for pilot signals on the last used frequency channel or a pre-selected frequency channel 602. Upon identifying or obtaining the strongest pilot signal on a PN offset of the frequency channel 604, the wireless device identifies or obtains the SID/NID of the cell associated with the pilot signal 606. The SID obtained may inform the mobile device of the region in which it is operating. The wireless device then determines whether the SID/NID pair is a desired one 608. To make this determination, the wireless device may look-up the preference rank of the SID/NID pair in its System Table. If the SID/ND pair has the highest preference of all other SID/NID pairs in its region (e.g., other System Table entries having the same SID), then the frequency channel and PN offset are used for communications 610. Otherwise, the wireless determines whether another pilot signal on the current frequency channel is likely to belong to a more preferred SID/NID 612. If so, the next strongest pilot signal in the current frequency channel is selected 614. Otherwise, another frequency, belonging to either the current SID/NID or to another SID/NID, is selected 616 and the pilot search process is repeated.

In one example, if a wireless device started by scanning frequency channel 600 (FIG. 4) and finds that the selected pilot signal originates from a cell belonging to SID 6 and NID 32 (FIG. 4), then it would learn that this SID/NID pair has a preference of Less Preferred. In general, the wireless device seeks to identify an SID/NID pair having the highest preference and its corresponding frequency channel(s) from the Acquisition Table. Since there are other SID/NID pairs with higher preferences (e.g., Most Preferred, Preferred), the wireless device selects the highest preferred SID/NID pair (i.e., SID 1, NID 12—Most Preferred). The index associated with the selected SID/NID pair is used to obtain one or more frequency channels from the Acquisition Table (i.e., channels 100, 200, and 300). The wireless device then selects one of the frequency channels (i.e., channels 100, 200, and 300), scans it for pilot signals 614, and identifies the SID/NID for the strongest pilot signal detected. If the strongest pilot signal detected belongs to the selected SID/NID pair (i.e., SID 1, NID 12) then it communicates via the cell associated with the pilot signal. Otherwise, the wireless device queries the cell associated the next strongest pilot signal until a match is found for the SID/NID pair. If no match is found after trying N different pilot signals on the same frequency channel (where N is an integer value greater than 1), the wireless device tries another of the one or more frequency channels (i.e., channels 100, 200, and 300). If no matching SID/NID is found in any of these frequency channels associated with the selected SID/NID pair, then the next highest preferred SID/NID pair (i.e., SID 2, NID 10) is obtained from the System Table and the process is repeated until a match is found.

The mobile device may check for a minimum threshold pilot signal power level before selecting a PN offset to insure a desired signal quality. If a pilot signal power level falls below the minimum threshold, then the mobile device tries other pilot signals or changes frequency channels.

Figure 7:
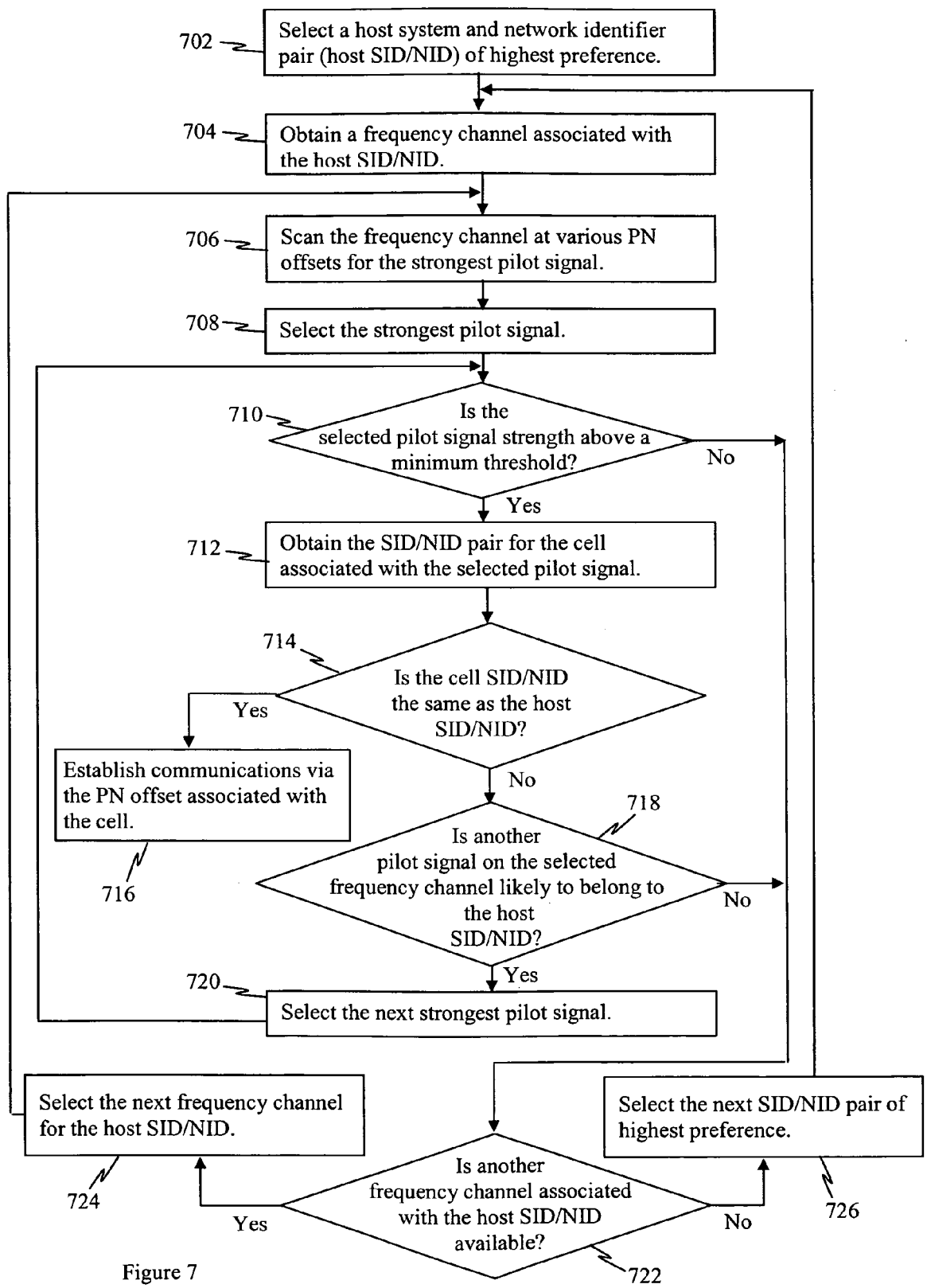
FIG. 7 is a flow diagram illustrating a method for performing intelligent cell search and selection according to one implementation.

FIG. 7 is a flow diagram illustrating a general method for performing intelligent cell search and selection according to one implementation. This method may be operable in a wireless device (i.e., host) implementing a CDMA-based communication protocol. A host system and network identifier pair (SID/NID) having the highest preference is selected 702. This may be done by checking the PRL (e.g., System Table) for the SID/NIDs with highest preference in a geographical region. A frequency channel associated with the host SID/NID is obtained 704. This frequency channel may be obtained from the PRL (e.g., Acquisition Table) where one or more frequency channels are provided for each SID/NID pair. The frequency channel is scanned at various PN offsets for the strongest pilot signal 706. The strongest pilot signal is then selected 708. To ascertain a minimum link quality, the pilot signal strength is compared to a minimum threshold 710. If the pilot signal strength is greater than the minimum threshold, then the SID/NID for the cell associated with the selected pilot signal is obtained 712. In one example, the SID/NID may be obtained from a channel synchronization message from the cell. The cell SID/NID is compared to the host SID/NID to determine whether they are the same 714. If the cell SID/NID and host SID/NID are the same, then the PN offset associated with the cell is used to establish communications 716. Otherwise, a determination is made as to whether it is likely that another pilot signal on the selected frequency channel belongs to the host SID/NID 718. For example, if the frequency channel currently being used is one of the highest preferred frequency channels but the pilot signal indicates that it is being used by another SID/NID pair, then it may be determined (after one or more pilot signals have been checked) that a different frequency channel should be tried. If there is likely to be another pilot signal belonging to the host SID/NID on the selected frequency channel, then the next strongest pilot signal on selected frequency channel is selected 720 and the verification process is repeated. Otherwise, if no other pilot signal belonging to the host SID/NID is likely to be found on the selected frequency channel or the pilot signal strength is below the minimum threshold, then a determination is made as to whether another frequency channel associated with the host SID/NID is available 722. If another frequency channel for the host SID/NID is available, then it is selected 724 and the pilot signal scanning and verification process is repeated. Otherwise, if no other frequency channels are assigned to the host SID/NID, then the next SID/NID pair of highest preference is selected 726 and the process is repeated. According to some implementations, the method in FIG. 7 may be performed after an initial scan of a startup or predetermined frequency channel where the strongest pilot signal is selected and its associated SID/NID is ascertained. The wireless device then looks-up the SID/NID pair in its System Table and its preference rank. If the SID/NID pair has the highest preference of all other SID/NID pairs, then the frequency channel and PN offset are used for communications. Otherwise, if there are other SID/NID pairs of higher preference in the region, then the mobile device selects the SID/NID pair of highest preference 702, obtains its assigned frequency channels 704, and scans one of the frequency channels for pilot signals 706. By focusing on the channel associated with the highest preferred SID and NID, the mobile device intelligently reduces the field of possible channels and more efficiently searches for pilot signals. This avoids the time delays associated with a brute force approach where all channels in a channel search list are scanned.

Another feature further provides a wireless device that stores the SIDs/NIDs found on various PN offsets during the scan process on a frequency channel. That is, as the wireless device scans PN offsets on one or more frequency channels it stores the SID/NIDs associates with each frequency channel and PN offset which it queries. This permits the wireless device to more quickly identify a PN offset to use if an SID/NID match is found.

In some implementations, during idle operation wireless mobile devices scan a frequency in search of new cells (by detecting the strongest pilot signal) which may provide a better link. One aspect of the invention maintains information about previously identified SIDs/NIDs at a particular PN offset of a frequency channel so that the mobile device doesn't try to switch back to a previously rejected SID/NID. That is, during such idle pilot signal search, a mobile device may find the strongest pilot signal at a PN offset that was previously identified and rejected (e.g., because it carried a less desirable SID/NID). This way, the mobile device avoids unnecessary evaluation of known PN offsets for a particular frequency.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A mobile device comprising:
a processing unit configured to
obtain a first system identifier (SID) and network identifier (NID) pair according to a preference rank,
obtain a first frequency channel associated with the first SID/NID pair;
scan one or more time offsets of the first frequency channel for pilot signals;
determine whether a detected pilot signal positively belongs to the first SID/NID sought; and
select a first time offset having the strongest pilot signal positively associated with the first SID/NID pair even when a stronger second pilot signal is previously detected in the first frequency channel but associated with a different SID/NID pair.

2. The mobile device of claim 1 wherein the processing unit is further configured to
compare the signal strengths of one or more pilot signals detected on the one or more time offsets for the first frequency channel.

3. The mobile device of claim 1 wherein the first time offset is selected if its associated pilot signal has a minimum threshold level.

4. The mobile device of claim 1 further comprising:
a wireless communication interface;
a storage device to store a roaming list including one or more SID/NID pairs and their one or more corresponding frequency channels; and
wherein the processing unit is coupled to the wireless communication interface and the storage device and is further configured to
obtain the first SID/NID pair from the roaming list.

5. The mobile device of claim 1 wherein if the strongest pilot signal on the first frequency channel is associated with an SID/NID pair other than the first SID/NID pair, then determine whether it is likely that another pilot signal on the first frequency channel is associated with the first SID/NID pair.

6. The mobile device of claim 1 wherein the processing unit is further configured to:
reject pilot signals on different time offsets that are stronger than the pilot signal on the first time offset if the pilot signals are associated with SID/NID pairs other than the first SID/NID pair.

7. The mobile device of claim 1 wherein, if a pilot signal associated with the first SID/NID pair is not found on the first frequency channel, the processing unit is further configured to
obtain a second frequency channel associated with the first SID/NID pair; and
scan one or more time offsets of the second frequency channel for the strongest pilot signal.

8. The mobile device of claim 1 wherein, if a pilot signal associated with the first SID/NID pair is not found on the first frequency channel, the processing unit is configured to
obtain a second SID/NID pair according to a preference rank,
obtain a second frequency channel associated with the second SID/NID pair;
scan one or more time offsets of the second frequency channel for the strongest pilot signal; and
select a second time offset having the strongest pilot signal associated with the second SID/NID pair.

9. The mobile device of claim 1 wherein, upon startup, the processing unit is configured to
scan one or more time offsets of a startup frequency channel for pilot signals;
select a second time offset having the strongest pilot signal found in the startup frequency channel;
obtain the SID/NID associated with the second time offset from a cell associated with the second time offset; and
compare the startup frequency channel to the first frequency channel to determine whether they are the same.

10. The mobile device of claim 9 wherein, if the startup frequency channel and first frequency channel are the same, the processing unit is configured to
determine if the second SID/NID pair is the same as the first SID/NID pair;
if the second SID/NID pair and first SID/NID pair are the same, then use the second SID/NID pair to establish a communication link with a cell operating on the second time offset of the startup frequency channel; and
if the second SID/NID pair and first SID/NID pair are not the same, then search for the strongest pilot signal associated with the first SID/NID pair on the first frequency channel.

11. The mobile device of claim 9 wherein, if the startup frequency channel and first frequency channel are not the same, the processing unit is configured to
scan the first frequency channel for a pilot signal associated with the first SID/NID pair.

12. The mobile device of claim 1 wherein the processing unit is further configured to
establish a communication link with a cell operating on the first time offset of the frequency channel.

13. The mobile device of claim 1 wherein the processing unit configured to implement a code division multiple access (CDMA) communication protocol.

14. The mobile device of claim 1 wherein the one or more time offsets are predetermined phase shifts of the frequency channel.

15. The mobile device of claim 1 wherein the processing unit is further configured to:
    store a time offset associated with an identified undesirable SID/NID pair; and
    perform a rescan of time offsets of the first frequency channel for the strongest pilot signal while ignoring pilot signals from the time offset associated with the undesirable SID/NID pair.

16. A mobile device comprising:
    means for obtaining a first system identifier (SID) and network identifier (NID) pair according to a preference rank;
    means for obtaining a first frequency channel associated with the first SID/NID pair;
    means for scanning one or more time offsets of the first frequency channel for pilot signals;
    means for determining whether a detected pilot signal positively belongs to the first SID/NID sought; and
    means for selecting a first time offset having the strongest pilot signal positively associated with the first SID/NID pair even when a stronger second pilot signal is previously detected in the first frequency channel but associated with a different SID/NID pair.

17. The mobile device of claim 16 further comprising:
    means for rejecting pilot signals on different time offsets that are stronger than the pilot signal on the first time offset if the pilot signals are associated with SID/NID pairs other than the first SID/NID pair.

18. A method operational on a mobile device for selecting a wireless communication channel and time offset, comprising:
    obtaining a first system identifier (SID)) and network identifier (NID) pair according to a preference rank;
    obtaining a first frequency channel associated with the first SID/NID pair;
    scanning one or more time offsets of the first frequency channel for pilot signals; and
    determining whether a detected pilot signal positively belongs to the first SID/NID sought;
    selecting a first time offset having the strongest pilot signal positively associated with the first SID/NID pair even when a stronger second pilot signal is previously detected in the first frequency channel but associated with a different SID/NID pair.

19. The method of claim 18 further comprising:
    comparing the signal strengths of one or more pilot signals detected on the one or more time offsets for the first frequency channel.

20. The method of claim 18 further comprising:
    determining whether the pilot signal of the first time offset meets a minimum threshold level.

21. The method of claim 18 further comprising:
    obtaining the first SID/NID pair from a roaming list that specifies a preference rank of SID/NID pairs.

22. The method of claim 18 further comprising:
    determining whether it is likely that another pilot signal on the first frequency channel is associated with the first SID/NID pair, if the strongest pilot signal on the first frequency channel is associated with an SID/NID pair other than the first SID/NID pair.

23. The method of claim 18 further comprising:
    rejecting pilot signals on different time offsets that are stronger than the pilot signal on the first time offset if the pilot signals are associated with SID/NID pairs other than the first SID/NID pair.

24. The method of claim 18 further comprising:
    storing time offsets associated with undesirable SID/NID pairs; and
    performing a rescan of time offsets of the first frequency channel for the strongest pilot signal while ignoring pilot signals from the time offsets associated with the undesirable SID/NID pairs.

25. A machine-readable storage medium comprising instructions executable by a processor on a mobile device for intelligently selecting a wireless communication channel and time offset, which when executed by a processor, causes the processor to perform operations comprising:
    obtaining a first system identifier (SID) and network identifier (NID) pair according to a preference rank;
    obtaining a first frequency channel associated with the first SID/NID pair;
    scanning one or more time offsets of the first frequency channel for pilot signals;
    determining whether a detected pilot signal positively belongs to the first SID/NID sought; and
    selecting a first time offset having the strongest pilot signal positively associated with the first SID/NID pair even when a stronger second pilot signal is previously detected in the first frequency channel but associated with a different SID/NID pair.

26. The machine-readable storage medium of claim 25 further including instructions that causes the processor to perform operations comprising
    storing time offsets associated with undesirable SID/NID pairs; and
    performing a rescan of time offsets of the first frequency channel for the strongest pilot signal while ignoring pilot signals from the time offsets associated with the undesirable SID/NID pairs.

27. A processor including a processing circuit adapted for wireless communications, the processing circuit configured to:
    obtain a first system identifier (SID) and network identifier (NID) pair according to a preference rank;
    obtain a first frequency channel associated with the first SID/NID pair;
    scan one or more time offsets of the first frequency channel for pilot signals;
    determine whether a detected pilot signal positively belongs to the first SID/NID sought; and
    select a first time offset having the strongest pilot signal positively associated with the first SID/NID pair even when a stronger second pilot signal is previously detected in the first frequency channel but associated with a different SID/NID pair.

28. The mobile device of claim 5 wherein if it is determined that it is likely that another pilot signal on the first frequency channel is associated with the first SID/NID pair, the processing circuit is further configured to
    continue to scan the first frequency channel for another pilot signal that positively belongs to the first SID/NID sought.

* * * * *

UNITED STATES PATENT AND TRADEMARK OFFICE
CERTIFICATE OF CORRECTION

PATENT NO. : 7,657,261 B2
APPLICATION NO. : 11/352510
DATED : February 2, 2010
INVENTOR(S) : Cooper et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this

Twenty-eighth Day of December, 2010

David J. Kappos
*Director of the United States Patent and Trademark Office*